US012810348B2

(12) United States Patent
Vinay et al.

(10) Patent No.: US 12,810,348 B2
(45) Date of Patent: Nov. 24, 2026

(54) METHODS AND SYSTEMS FOR ENABLING SEAMLESS INDIRECT INTERACTIONS

(71) Applicant: SAMSUNG ELECTRONICS CO., LTD., Suwon-si (KR)

(72) Inventors: Boddu Venkata Krishna Vinay, Karnataka (IN); Bhiman Kumar Baghel, Karnataka (IN); Gorang Maniar, Karnataka (IN); Syed Khaja Moinuddin, Karnataka (IN); Sudhansu Ranjan Acharya, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 166 days.

(21) Appl. No.: 18/517,995

(22) Filed: Nov. 22, 2023

(65) Prior Publication Data

US 2024/0087575 A1 Mar. 14, 2024

Related U.S. Application Data

(63) Continuation of application No. PCT/KR2023/013180, filed on Sep. 4, 2023.

(30) Foreign Application Priority Data

Sep. 9, 2022 (IN) ............................ 202241051693
Aug. 14, 2023 (IN) ............................ 202241051693

(51) Int. Cl.
*G06Q 30/0601* (2023.01)
*G06Q 10/40* (2026.01)
(Continued)

(52) U.S. Cl.
CPC ......... *G06Q 30/0641* (2013.01); *G06Q 10/40* (2026.01); *G10L 15/22* (2013.01); *G10L 15/30* (2013.01); *G16Y 10/80* (2020.01)

(58) Field of Classification Search
USPC .................................................... 704/1–504
See application file for complete search history.

(56) References Cited

U.S. PATENT DOCUMENTS 10,924,144 B2 * 2/2021 Zalewski ............... H04W 4/80
11,509,525 B1 11/2022 Iyer et al.
(Continued)

FOREIGN PATENT DOCUMENTS

CN 111355644 A 6/2020
CN 107919121 B 6/2021
(Continued)

OTHER PUBLICATIONS

International Search Report (PCT/ISA/210) and Written Opinion (PCT/ISA/237) issued by the International Searching Authority on Nov. 28, 2023 in International Application No. PCT/KR2023/013180.
(Continued)

*Primary Examiner* — Marcus T Riley
(74) *Attorney, Agent, or Firm* — Sughrue Mion, PLLC

(57) ABSTRACT

Methods, systems, and apparatuses for enabling indirect interactions between users in an Internet of Things (IoT) environment are provided. A method includes receiving, by a first device, an utterance from a first user, wherein the utterance relates to at least one task that is to be performed by the first user; based on receiving the utterance, identifying, by the first device, one or more second users related to the at least one task; providing, by the first device, an interactable interface to one or more second devices which are located closer to the one or more second users than the first device; receiving, by the first device, one or more inputs corresponding to the at least one task from the one or more
(Continued)

second users through the interactable interface; and appending, by the first device, the received one or more inputs to the at least one task.

15 Claims, 11 Drawing Sheets

(51) Int. Cl.

| | |
|---|---|
| ***G10L 15/22*** | (2006.01) |
| ***G10L 15/30*** | (2013.01) |
| ***G16Y 10/80*** | (2020.01) |

(56) References Cited

U.S. PATENT DOCUMENTS

| | | | | |
|---|---|---|---|---|
| 12,015,436 | B2 * | 6/2024 | Zalewski | G06Q 30/0635 |
| 12,045,568 | B1 * | 7/2024 | Shrivastava | G10L 15/1815 |
| 2017/0235848 | A1 * | 8/2017 | Van Dusen | G06Q 10/10 705/12 |
| 2018/0329982 | A1 * | 11/2018 | Patel | G06F 16/3322 |
| 2019/0079724 | A1 * | 3/2019 | Feuz | G06F 40/20 |
| 2020/0244297 | A1 * | 7/2020 | Zalewski | H04L 67/10 |
| 2021/0073361 | A1 | 3/2021 | Lazzaro et al. | |
| 2021/0194528 | A1 * | 6/2021 | Zalewski | G06Q 30/0635 |
| 2022/0013129 | A1 * | 1/2022 | Carbune | G06F 3/167 |
| 2022/0020358 | A1 | 1/2022 | Song et al. | |
| 2022/0091905 | A1 | 3/2022 | Lee et al. | |
| 2022/0093086 | A1 | 3/2022 | Eedarapalli | |
| 2023/0261897 | A1 | 8/2023 | Heo et al. | |
| 2024/0087575 | A1 * | 3/2024 | Vinay | G06Q 30/0641 |
| 2024/0340034 | A1 * | 10/2024 | Zalewski | G06Q 20/12 |

FOREIGN PATENT DOCUMENTS

| | | | |
|---|---|---|---|
| CN | 113470634 | A | 10/2021 |
| EP | 3 583 747 | B1 | 10/2020 |
| WO | 2021/174089 | A1 | 9/2021 |
| WO | 2022/072801 | A2 | 4/2022 |
| WO | 2022/149693 | A1 | 7/2022 |

OTHER PUBLICATIONS

Communication issued May 27, 2025 by the European Patent Office in European Patent Application No. 23863440.6.

Communication issued on Jun. 5, 2025 by the Indian Patent Office in Indian Patent Application No. 202241051693.

* cited by examiner

METHODS AND SYSTEMS FOR ENABLING SEAMLESS INDIRECT INTERACTIONS

CROSS-REFERENCE TO RELATED APPLICATION

This application is a bypass continuation of International Application No. PCT/KR2023/013180, filed on Sep. 4, 2023, which is based on and claims priority to Indian Provisional Application No. 202241051693, filed on Sep. 9, 2022, in the Indian Intellectual Property Office, and Indian Complete Patent Application No. 202241051693, filed on Aug. 14, 2023, in the Indian Intellectual Property Office, the disclosures of which are incorporated by reference herein in their entireties.

BACKGROUND

1. Field

The disclosure relates to human-machine interactions, and more particularly to enabling seamless indirect interactions among one or more members in a specific environment.

2. Description of Related Art

Smart devices in a particular environment may be capable of interacting with the outside world and with each other. However, there is a need for specific methods and devices to enable indirect interactions between devices within the environment.

As an example, consider an environment such as a home, in which a mother intends to go shopping. In order to prepare to do so, she may interact directly (e.g., over calls, chat, face-to-face, and so on) with every family member to get their specific requirements/needs.

As another example scenario, consider an environment such as a garage, in which a person may be stuck in a tight spot and may need a new tool box, but there is no one else in earshot. The person who is stuck may get out of the tight spot and then fetch the tool box by himself, or may contact another person to fetch the tool box.

As yet another example, consider an environment such as a home, in which a child may be studying and may be disturbed by the loud volume of a television. The child may get up, and either request the television to be turned down, or turn down the television.

These examples show that smart homes may be not smart enough to enable seamless indirect interactions, causing inconvenience, repetitive actions, and tiresome processes that require more effort and time. Even though smart homes provide some opportunities to interact indirectly, users may still choose less efficient direct interactions.

SUMMARY

Provided are methods, systems, and apparatuses for enabling seamless indirect interactions in an environment, wherein the system enables seamless indirect interactions among devices and users present in an Internet of Things (IoT) environment.

Also provided are methods, systems, and apparatuses for predicting at least one context from an utterance received from the user.

Also provided are methods, systems, and apparatuses for identifying the one or more second users related to the predicted context.

Also provided are methods, systems, and apparatuses for predicting current location of the one or more second users based on an IoT data.

Also provided are methods, systems, and apparatuses for correlating the obtained user context data and the environment context data from a database with the at least one context from the utterance.

Also provided are methods, systems, and apparatuses for providing at least one of an interaction and a suggestion to the one or more second users through an interactable interface using a deep learning method.

Also provided are methods, systems, and apparatuses for appending one or more inputs from the second users related to one task that is to be performed by the first user.

Additional aspects will be set forth in part in the description which follows and, in part, will be apparent from the description, or may be learned by practice of the presented embodiments.

In accordance with an aspect of the disclosure, a method for enabling indirect interactions between users in an Internet of Things (IoT) environment includes: receiving, by a first device, an utterance from a first user, wherein the utterance relates to at least one task that is to be performed by the first user; based on receiving the utterance, identifying, by the first device, one or more second users related to the at least one task; providing, by the first device, an interactable interface to one or more second devices which are located closer to the one or more second users than the first device; receiving, by the first device, one or more inputs corresponding to the at least one task from the one or more second users through the interactable interface; and appending, by the first device, the received one or more inputs to the at least one task.

The identifying the one or more second users related to the task may include predicting, by the first device, at least one context based on the utterance received from the first user; and identifying, by the first device, the one or more second users related to the predicted at least one context.

The predicting the at least one context and the identifying the one or more second users may be performed using a trained learning method.

The method may further include: obtaining, by the first device, IoT data; based on the IoT data, determining, by the first device, location history of at least one device which was last accessed by the one or more second users, based on the IoT data; and determining, by the first device, a current location of the one or more second users based on the location history.

The one or more second devices may be selected by the first device based on an availability of the one or more second devices, and a capability of the one or more second devices for performing at least one of delivering and receiving messages.

The providing the interactable interface to the one or more second devices may include generating at least one of an interaction and a suggestion to provide to the one or more second users, and the generating the at least one of the interaction and the suggestion may include: obtaining, by the first device, user context data and environment context data; and correlating, by the first device, the user context data and the environment context data with the predicted at least one context.

The method may further include: based on at least a portion of the user context data and the environment context data being matched with the predicted at least one context, generating, by the first device, at least one suggestion, wherein the at least one suggestion is provided based on data stored in the one or more second devices or is provided as a recommendation that is relevant to the predicted at least one context; and based on the at least the portion of the user context data and the environment context data being not matched with the predicted at least one context, generating, by the first device, at least one interaction for directly conveying a message based on the utterance.

The one or more inputs may include at least one of a requirement corresponding to the at least one task and an action content to be performed according to the at least one task.

In accordance with an aspect of the disclosure, a device for enabling indirect interactions among users in an Internet of Things (IoT) environment includes: at least one processor configured to: receive an utterance from a first user, wherein the utterance relates to at least one task that is to be performed by the first user; based on receiving the utterance, identify one or more second users related to the at least one task; provide an interactable interface to one or more target devices which are located closer to the one or more second users than the device; receive one or more inputs corresponding to the at least one task from the one or more second users through the interactable interface; and append the received one or more inputs to the at least one task.

The at least one processor may be further configured to: predict at least one context based on the utterance received from the first user; and identify the one or more second users related to the predicted at least one context.

The at least one processor may be further configured to perform the predicting of the at least one context and the identifying of the one or more second users using a trained learning method.

The at least one processor may be further configured to: obtain IoT data; determine location history of at least one device which was last accessed by the one or more second users, based on the IoT data; and determine a current location of the one or more second users based on the location history.

The at least one processor may be further configured to select the one or more target devices based on an availability of the one or more target devices, and a capability of the one or more target devices for performing at least one of delivering and receiving messages.

The at least one processor may be further configured to provide the interactable interface to the one or more target devices by generating at least one of an interaction and a suggestion to provide to the one or more second users, and to generate the at least one of the interaction and the suggestion, the at least one processor may be further configured to: obtain user context data and environment context data; and correlate the user context data and the environment context data with the predicted at least one context.

The at least one processor may be further configured to: based on at least a portion of the user context data and the environment context data being matched with the predicted at least one context, generate at least one suggestion, wherein the at least one suggestion is provided based on data stored in the one or more target devices or is provided as a recommendation that is relevant to the predicted at least one context; and based on the at least the portion of the user context data and the environment context data being not matched with the predicted at least one context, generate at least one interaction for directly conveying a message based on the utterance.

In accordance with an aspect of the disclosure, a system for enabling indirect interactions among users in an Internet of Things (IoT) environment includes: one or more target devices; and a source device comprising at least one processor configured to: receive an utterance from a first user, wherein the utterance relates to at least one task that is to be performed by the first user; based on receiving the utterance, identify one or more second users related to the at least one task; provide an interactable interface to the one or more target devices, wherein the one or more target devices are located closer to the one or more second users than the source device; receive one or more inputs corresponding to the at least one task from the one or more second users through the interactable interface; and append the received one or more inputs to the at least one task.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
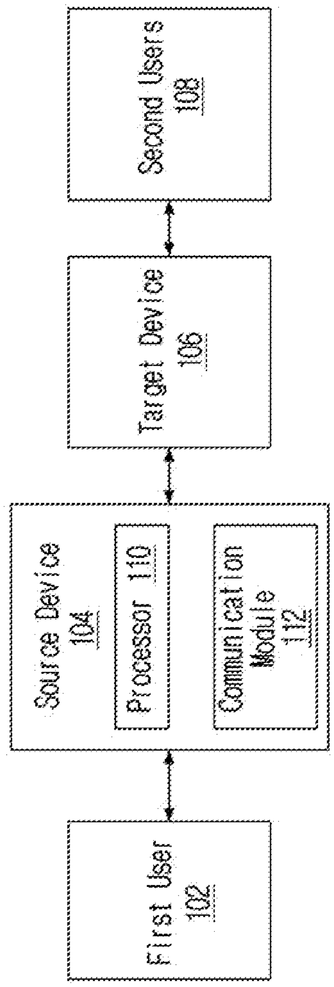
FIG. 1 is an example block diagram depicting components of a system for providing seamless indirect interactions among devices and users present in an Internet of Things (IoT) environment, according to one or more embodiments.

The present disclosure and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein may relate to methods, apparatuses, and systems for enabling seamless indirect interactions in an Internet of Things (IoT) environment, in which an engine enables seamless indirect interactions among devices and users present in the IoT environment. Referring now to the drawings, and more particularly to FIGS. 1 through 11, where similar reference characters denote corresponding features consistently throughout the figures, exemplary embodiments are described below.

FIG. 1 depicts a system 100 for enabling seamless indirect interactions in the IoT environment, according to one or more embodiments. The system 100 may include a source device 104 corresponding to a first user 102, and one or more target devices 106 corresponding to one or more second users 108. In embodiments, the source device 104 may be referred to as a first device, and the one or more target devices 106 may be referred to as one or more second devices. In embodiments, the first user 102 may be referred to as a source user or source entity, and the one or more second users 108 may be referred to as one or more target users or one or more target entities. The target device 106 may also be a real world device present in the real world environment of a second user 108. Examples of the target device 106 may include a desktop computer, a laptop computer, a mobile device such as a smart phone, a personal digital assistant, a wearable device, a kitchen appliance, and a smart appliance, but embodiments are not limited thereto. The target device 106 may be one or more other devices present in a location which is closer to the one or more second users than the first device 104. The second user 108 may be, for example a target user.

The source device 104 may include a processor 110 and a communication module 112. The source device 104 may be a real world device present in the real world environment of the first user 102. Examples of the source device 104 may include a desktop computer, a laptop computer, a mobile device such as a smart phone, a personal digital assistant, a wearable device, a kitchen appliance, and a smart appliance, but embodiments are not limited thereto.

In an embodiment, the processor 110 may be configured to enable a device such as the source device 104 to gather information or requirements from one or target users based on one or more tasks. The task may be a task which is to be performed by the first user 102 and/or on behalf of the first user 102, and which may depend upon the input of the one or more target users. The processor 110 may determine the locations of the one or more target devices 106 and entities related to the task, and may provide suggestions to one or more target users, such that the target users may be used by at least one of the source device 104 and the first user 102 to make informed decisions. A plurality of modules may be utilized for interfacing of a device to one or more target devices.

In an embodiment, the processor 110 may include one or more of microprocessors, circuits, and other hardware configured for processing. The processor 110 may be configured to execute instructions stored in a database.

The processor 110 may be at least one of a single processer, a plurality of processors, multiple homogeneous or heterogeneous cores, multiple Central Processing Units (CPUs) of different kinds, microcontrollers, special media, and other accelerators. The processor 110 may be an application processor (AP), a graphics-only processing unit such as a graphics processing unit (GPU), a visual processing unit (VPU), and/or an Artificial Intelligence (AI)-dedicated processor such as a neural processing unit (NPU).

In an embodiment, the communication module 112 may be configured to enable communication between the source device 104 and one or more target devices 106. The server may be configured or programmed to execute instructions of the first device 104. The communication module 112 through which the source device 104 and the server communicate may be in the form of either a wired network, a wireless network, or a combination thereof. Examples wired and wireless communication networks may include Global Positioning System (GPS), Global System for Mobile Communication (GSM), Local Area Network (LAN), Wireless Fidelity (Wi-Fi) compatibility, and Near-Field Communication (NFC), but embodiments are not limited thereto. Examples of the wireless communication may further include one or more of Bluetooth, ZigBee, a short-range wireless communication such as Ultra-Wideband (UWB), a medium-range wireless communication such as Wi-Fi, and a long-range wireless communication such as 3G/4G/5G or Worldwide Interoperability for Microwave Access (WiMAX), according to the usage environment, but embodiments are not limited thereto.

Although FIG. 1 shows various hardware components of the system 100, but it is to be understood that other embodiments are not limited thereon. In other embodiments, the system 100 may include less or more number of components. Further, the labels or names of the components are used only for illustrative purpose and does not limit the scope of the disclosure. One or more components may be combined together to perform same or substantially similar function in the system 100.

Figure 2:
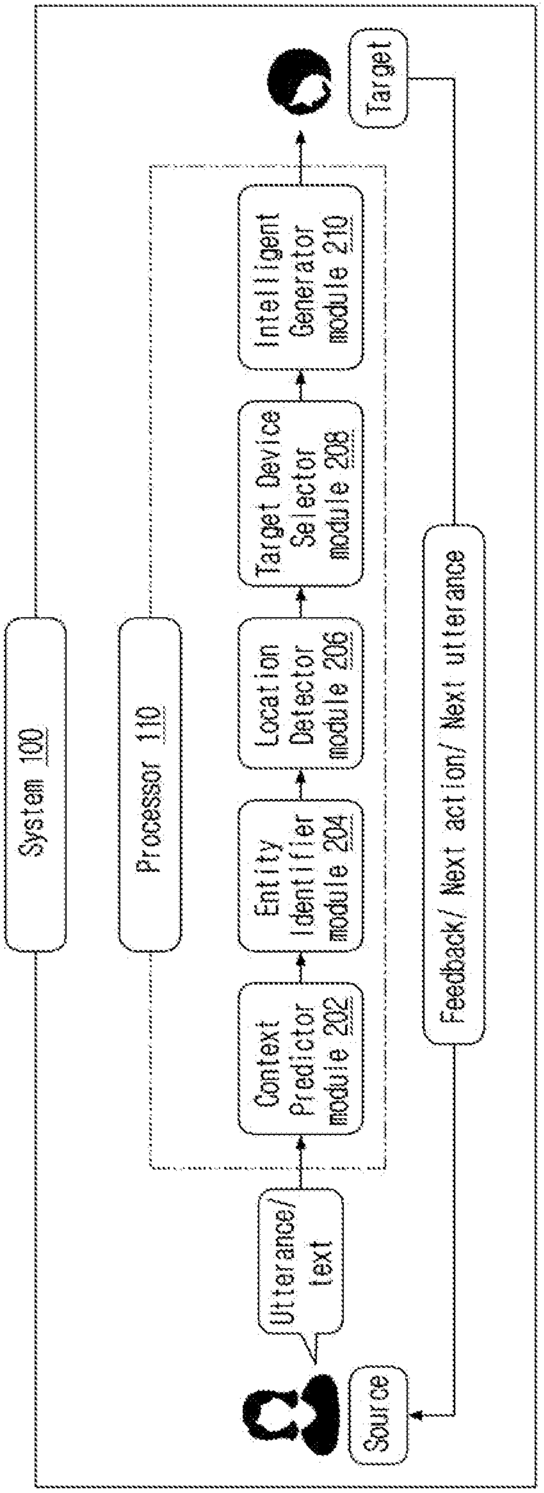
FIG. 2 illustrates an architecture of the system for providing seamless indirect interactions, according to one or more embodiments.

FIG. 2 illustrates an architecture of the system 100 for providing seamless indirect interactions among devices and users present in the IoT environment, according to one or more embodiments. In embodiments, the environment may refer to a home, an office and so on. The processor 110 may include a context predictor module 202, an entity identifier module 204, a location detector module 206, a target device selector module 208, and an intelligent generator module 210. The processor 110 may detect an input from a user, e.g. the first user 102 or the one or more second users 108. In embodiments, the input may include at least one of an utterance, a text, and so on, but embodiments are not limited thereto. Based on the input, the context predictor module 202 may determine one or more contexts. For example, the context predictor module 202 may determine the context of utterances received from the first user 102. In an embodiment, the context predictor module 202 may determine the context of an utterance in real time. The context predictor module 202 may predict the context using a trained learning method, wherein the learning method may be trained using data maintained in a database. The entity identifier module 204 may determine the entities (or users) that may be involved in this interaction. The entity identifier module 204 may extract the entities (or users) based on the received utterance, and categorize the entities (or users) as source entities and target entities. The entity identifier module 204 may identify the one or more second users 108 using a trained learning method, wherein the learning method may be trained using data maintained in the database. The location detector module 206 may determine locations of the first user 102 and one or more second users 108. The location detector module 206 may obtain the locations of the data based on a camera data, a user profile data and a historical data from the database. Further, the location detector module 206 may determine the location history of one or more devices which were last accessed by the one or more second users 108 based on IoT data, and may predict the current location of the one or more second users 108 based on the determined location history. The target device selector module 208 may determine one or more target devices 106 corresponding to entities associated with the interaction. The target device selector module 208 may select the one or more target devices 106 based on their availability and capability of performing at least one of delivering and receiving messages using a learning method. In an embodiment, the same device may be selected for both categories. In an embodiment, different devices may be selected for each category. The system 100 may provide at least one interaction/suggestion to the one or more second users 108. The system 100 may further provide feedback in the form of actions or utterances to the one or more second users 108.

The database may comprise one or more volatile and non-volatile memory components which are capable of storing data and instructions to be executed. Examples of the memory module may include NAND, embedded Multimedia Card (eMMC), Secure Digital (SD) cards, Universal Serial Bus (USB), Serial Advanced Technology Attachment (SATA), and a solid-state drive (SSD), but embodiments are not limited thereto. The memory module may also include one or more computer-readable storage media. Examples of non-volatile storage elements may include magnetic hard discs, optical discs, floppy discs, flash memories, or forms of electrically programmable memories (EPROM) or electrically erasable and programmable (EEPROM) memories. In addition, the memory module may, in some examples, be considered a non-transitory storage medium. The term "non-transitory" may indicate that the storage medium is not embodied in a carrier wave or a propagated signal. However, the term "non-transitory" should not be interpreted to mean that the memory module is non-movable. In certain examples, a non-transitory storage medium may store data that can, over time, change (e.g., in Random Access Memory (RAM) or cache).

The intelligent generator module 210 may generate at least one interaction and suggestion to provide to the one or more second users through the interactable interface using a deep learning method. The intelligent generator module 210 may obtain user context data and environment context data from the database. Further, the intelligent generator module 210 may correlate the obtained user context data and the environment context data with at least one context from the utterance. Further, the intelligent generator module 210 may generate at least one suggestion if at least a portion of the obtained user context data and the environment context data match at least one context from the utterance. The intelligent generator module 210 may provide the suggestion based on data stored in the one or more target devices 106 in accordance with information related to the past search or prior history or as a recommendation, relevant to the predicted at least one context. The intelligent generator module 210 may generate at least one interaction if at least a portion of the obtained user context data and the environment context data does not match with at least one context from the utterance for directly conveying a message from the utterance.

The system 100 may enable the first user 102 to gather information or requirements from the one or more second users 108 based on one or more tasks. Further, the system 100 may append one or more inputs from the one or more second users 108 related to the task that is to be performed by the first user 102, wherein the one or more inputs may include at least one of the requirements and action content to be performed.

Figure 3:
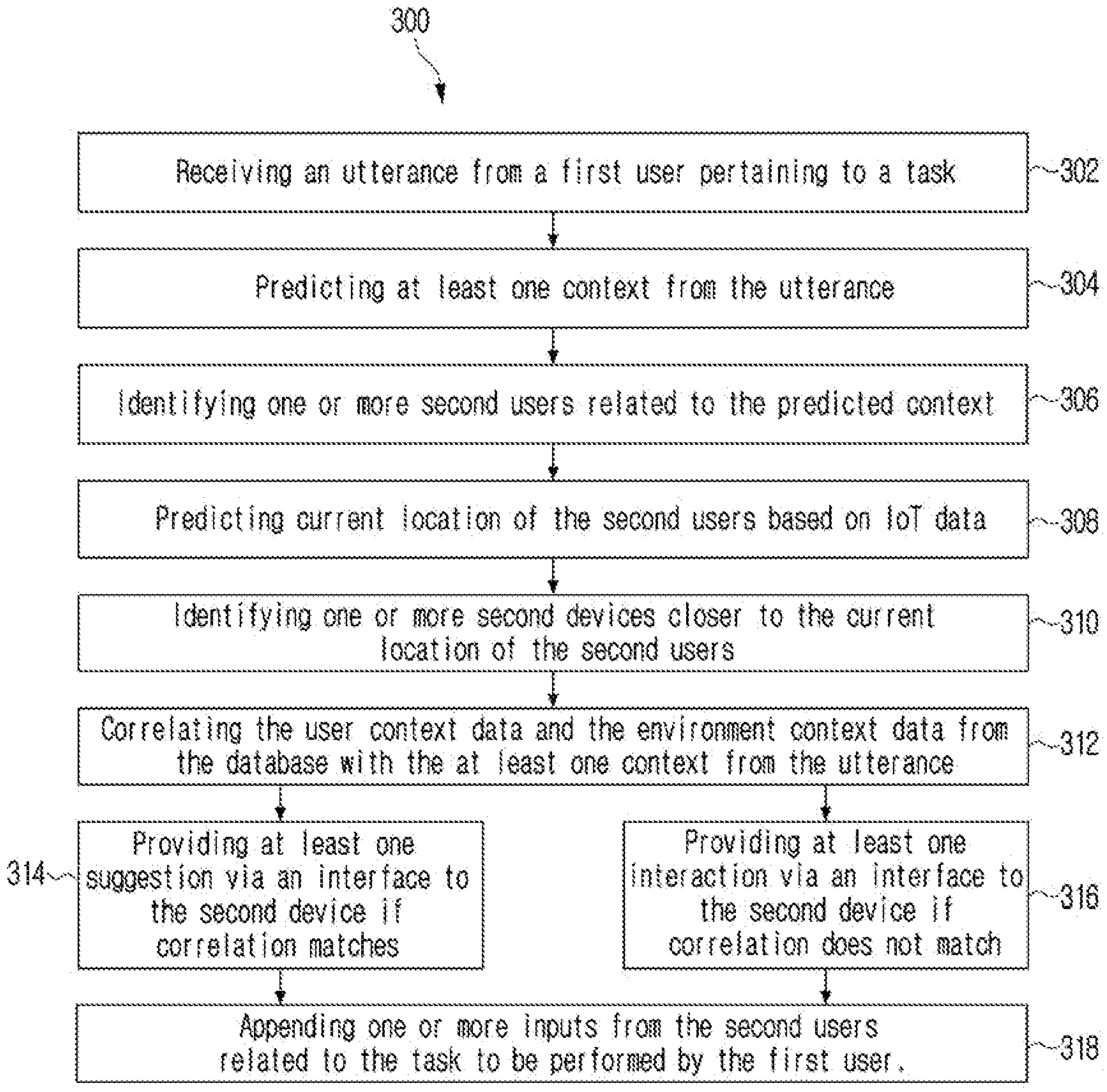
FIG. 3 is a flowchart of a method for providing seamless indirect interactions among devices and users present in the IoT environment, according to one or more embodiments.

FIG. 3 is a flowchart illustrating a method 300 for enabling seamless indirect interactions in an environment, according to one or more embodiments. The operations 302 to 318 described below may be handled by the processor 110. At operation 302, the method includes receiving, by a source device 104, an utterance from a first user 102, wherein the utterance pertains to one or more tasks to be performed by the first user 102 and/or performed on behalf of the first user 102 and/or the first user 102 wants to be performed.

At operation 304, the method includes predicting, by the source device 104, at least one context from the utterance received from the first user 102.

At operation 306, the method includes identifying, by the source device 104, the one or more second users 108 related to the predicted at least one context, wherein the method of predicting the at least one context and identifying the one or more second users 108 are performed using a trained learning method, and the learning method is trained using data maintained in the database.

At operation 308, the method includes obtaining, by the source device 104, IoT data, wherein the IoT data may include at least one of the camera data, the user profile data, and the historical data from the database, but embodiments are not limited thereto. Using the IoT data, the source device 104 may determine location history of at least one last accessed device of the one or more second users 108. The source device may predict a current location of the one or more second users 108 based on the determined location history.

At operation 310, the method includes identifying one or more target devices 108 which are located closer to the one or more second users 108 than the first device 104, wherein the source device 104 selects the one or more target devices 106 based on availability and capability for performing at least one of delivering and receiving messages, using the learning method.

At operation 312, the method includes providing, by the source device 104, an interactable interface via one or more target devices 106 present in a location closer to the one or more second users 108, wherein the source device 104 generates at least one of an interaction and suggestion to provide to the one or more second users 108 through the interactable interface using a deep learning method. The method further includes obtaining, by the source device 104, a user context data and an environment context data from the database and correlating, by the source device 104, the obtained user context data and the environment context data with the at least one context from the utterance.

At operation 314, the method includes generating, by the source device 104, at least one suggestion based on at least a portion of the obtained user context data and the environment context data being matched with the at least one context from the utterance.

At operation 316, the method includes generating, by the source device 104, at least one interaction based on the at least a portion of the obtained user context data and the environment context data being not matched with the at least one context from the utterance, for directly conveying a message from the utterance.

At operation 318, the method includes receiving, by the source device 104, one or more inputs corresponding to the task from the one or more second users 108 through the interface, and appending, by the source device 104, the received one or more inputs to the task that is to be performed by the first user 102.

One or more of the operations of method 300 described above may be performed in the order presented, in a different order, or simultaneously. Further, in some embodiments, some actions listed in FIG. 3 may be omitted.

The processor 110 may control the processing of the input data in accordance with a predefined operating rule or Artificial Intelligence (AI) model stored in the non-volatile memory and the volatile memory. The predefined operating rule or artificial intelligence model is provided through training or learning.

Here, being provided through learning may mean that a predefined operating rule or AI model of a desired characteristic is made by applying a learning algorithm to a plurality of learning data. The learning may be performed in a device itself in which AI according to an embodiment is performed, and/or may be implemented through a separate server/system.

The learning algorithm may be a method for training a predetermined device (for example, a robot) using a plurality of learning data to cause, allow, or control the device to make a determination or prediction. Examples of learning algorithms include, but are not limited to, supervised learning, unsupervised learning, semi-supervised learning, or reinforcement learning.

Figure 4:
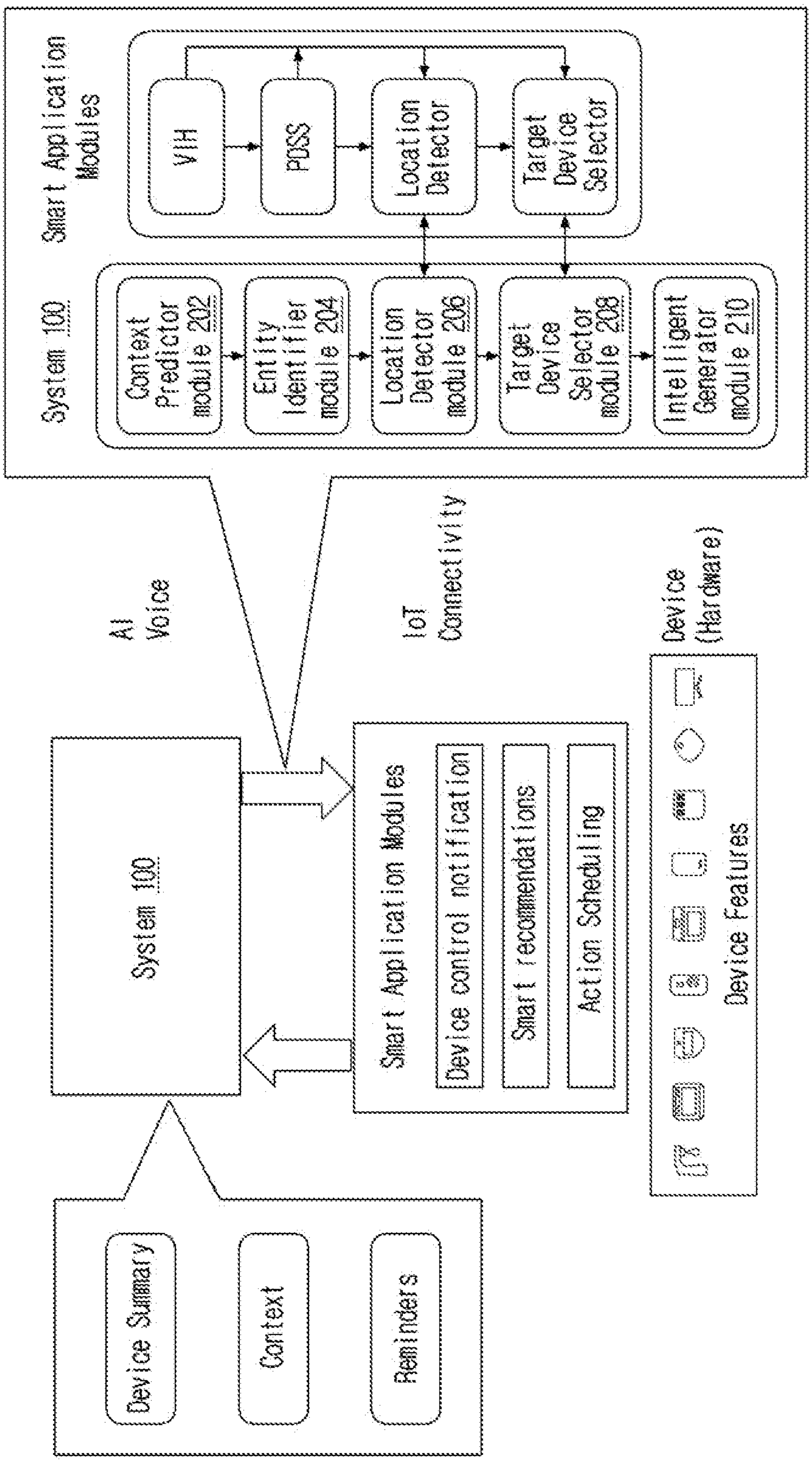
FIG. 4 is block diagram of a system integrated with smart application modules, according to one or more embodiments.

FIG. 4 illustrates an example architecture of the system 100, which may be integrated with smart application modules and includes AI voice and IoT connectivity, according to one or more embodiments. The architecture describes the interconnection of all the system's components with the device features based on the context and reminders and perform multiple functions. The functions may include device control notifications, smart recommendations, and action scheduling, but embodiments are not limited thereto. The system 100 may simultaneously transmit and receive information while communicating with the device and performing its functions. For example, the user may turn the device notifications on or off and control the functions of the device. The system 100 may perform actions based on the smart recommendations provided by the device in the scheduled manner. The system 100 may communicate with other smart devices and obtain complete details about the location of users and devices in the IoT environment by the target device selection unit and location detection unit. The location detector may be GPS and Bluetooth along with crowd-sourced Wi-Fi hotspot, cell tower locations and so on. For example, the target device 106 may be assigned to and/or associated with the physical location. The target device 106 with the same or similar name/brand may be selected. The target device 106 may be paired to the device by default, and so on.

Figure 5:
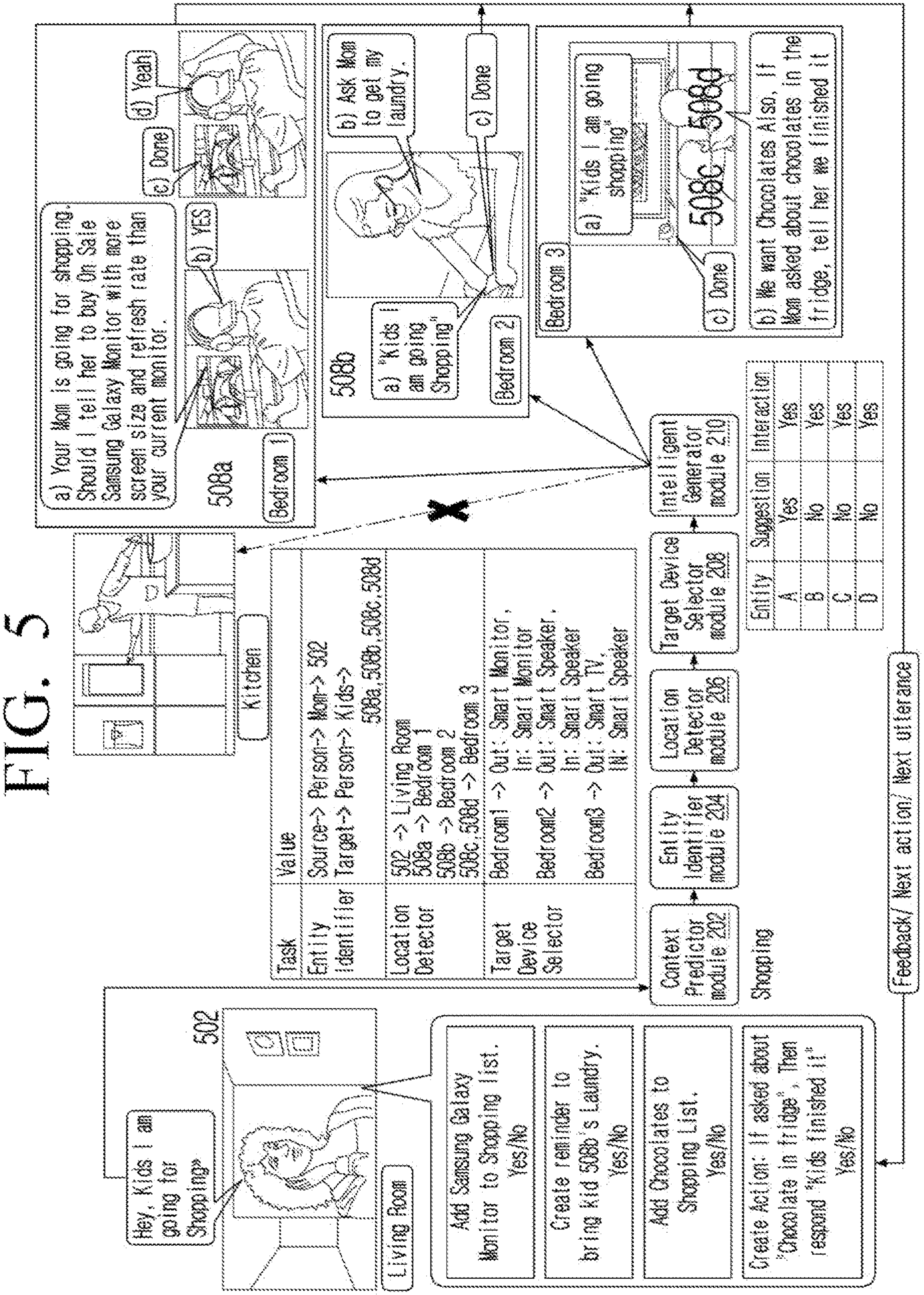
FIG. 5 is a use case diagram for shopping, according to one or more embodiments.

FIG. 5 illustrates an example scenario in which a mom 502 in a house intends to go out shopping, according to one or more embodiments. The system 100 may predict the context of the task (e.g., shopping) of the source user 102 (e.g., mom 502) and may identify target users 108 to whom this may be of interest (e.g., kid 508*a*, kid 508*b*, kid 508*c*, and kid 508*d*). The system 100 may determine the locations of the smart devices and entities and determine one or more target devices 106 corresponding to the entities. The system 100 may interact with the one or more target devices, wherein the kids 508*a*-508*d* are queried as to whether they have any shopping requirements. The kids 508*a*-508*d* may provide feedback in terms of one or more items to be picked up. The system 100 may then accordingly provide feedback/additional actions/other utterances to the mother.

In the example shown herein, the mom 502 provides an utterance asking her kids 508*a*-508*d* about their requirements, if any, as "Hey, kids, I am going shopping." The system 100 provides the suggestion or the interaction to her kids 508*a*-508*d* through the interactable interface as "Your Mom is going shopping". In bedroom 1, the system 100 provides the suggestion, "Should I tell her to buy an on-sale Samsung Galaxy Monitor with more screen size and refresh rate than your current monitor?" Kid 508*a* replied, "Yes". In bedroom 2, kid 508*b* replied, "Ask Mom to get my laundry." In bedroom 3, kid 508*c* and 508*d* replied, "We want Chocolates! Also, If Mom asks about chocolates in the fridge, tell her we finished those." The system 100 appends the received input from the target devices 106 (associated with kids 508*a*-508*d*) to the source device 104 (associated with Mom 502) through the interactable interface as "Add Samsung Galaxy Monitor to Shopping List,", "Create a reminder to bring kid 508*b*'s Laundry", "Add Chocolates to Shopping List,", and "Create Action: If asked about "Chocolate in the fridge", Then respond "Kids finished it," respectively. Therefore, in the example shown herein, the system 100 provides suggestions only to one user (e.g., kid 508*a*) as a recommendation.

The context may be shopping, ordering a meal, preparing food, paying rent, and other things. In the example shown herein, the context identified as shopping.

In the example shown herein, after categorization, Mom 502 may be considered as a source entity or a source user 102, and kids 508*a*-508*d* may be considered as a target entity or one or more target users 108.

In the example shown herein, the location detector module 206 identifies the first user 102 (e.g., Mom 502) is in living room and the second users 108 are in various bedrooms (e.g., kid 508*a* is in bedroom 1, kid 508*b* is in bedroom 2, and kids 508*c* and 508*d* are in bedroom 3).

In bedroom 1, the target device selector module 208 may select a smart monitor as an input and output device. In bedroom 2, the target device selector module 208 may select a smart speaker as an input and output device. In bedroom 3, the target device selector module 208 may select a smart speaker as an input device and a smart TV as an output device.

The intelligent generator module 210 may provide at least one interaction and suggestion to the target users 108 through the interactable interface. The intelligent generator module 210 may not involve unintended entities. In the example shown herein, the husband may be in the kitchen, and may not be a target entity.

Figure 6:
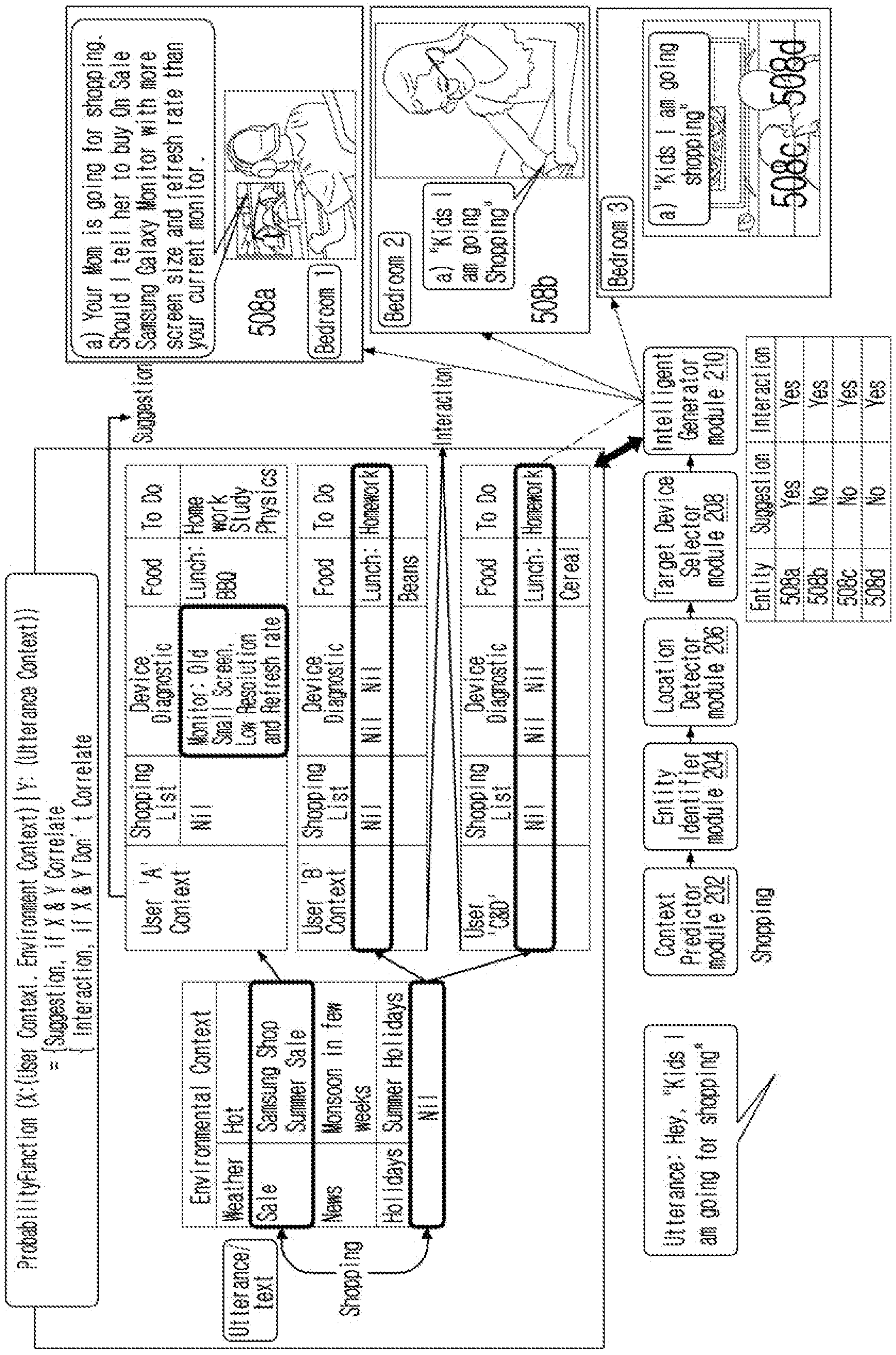
FIG. 6 illustrates an architecture of intelligent generator module, according to one or more embodiments.

FIG. 6 illustrates an example of an architecture of the intelligent generator module 210, according to one or more embodiments. The intelligent generator module 210 may include a decision-making module. The intelligent generator module 210 may obtain user context data and environment context data from the database. The decision-making module of the intelligent generator module 210 may provide interactions or suggestions to the one or more second users 108 to make informed decisions. The intelligent generator module 210 may provide a probability function of X='User Context' plus 'Environment Context' given Y='Utterance Context'. Then, the decision-making module may provide interactions or suggestions according to the function shown in Equation 1 below. This function may provide the suggestion when at least some parts of X and Y correlate, or else may produce the interaction to the one or more second users through the interactable interface using a deep learning method. i.e., directly conveying the message.

$$\text{Probability Function } (X\text{:(User Context, Environment Context)}|Y\text{:(Utterance Context)})=\{\text{Suggestion, if } X \,\&\, Y \text{ Correlate}\}\{\text{Interaction, if } X \,\&\, Y \text{ Don't Correlate}\}. \quad \text{Equation 1:}$$

In the example discussed above, the context (e.g., shopping) may be identified from the received input/utterance from the first user 102 (e.g., Mom 502) as "Kids I am going shopping". Further, the environment context (e.g., Sale: (Samsung shop/Summer sale)) may be determined based on the identified context (e.g., shopping) as the one or more second users have been determined to be in different bedrooms.

In the case of kid 502*a* context, the obtained user context data and the environment context data may be matched with the one context from the utterance, and the system may generate the suggestion as a recommendation through the identified devices (monitors: old, small screen, and low resolution) as "Your Mom is going shopping. Should I tell her to buy the on-sale Samsung Galaxy Monitor with more screen size and refresh rate than your current monitor?" In the case of user 'contexts for kids 502*b*-502*d*, the obtained user context data and the environment context data may be not matched with the one context from the utterance, so the system 100 provides interactions only in place of suggestions.

Figure 7:
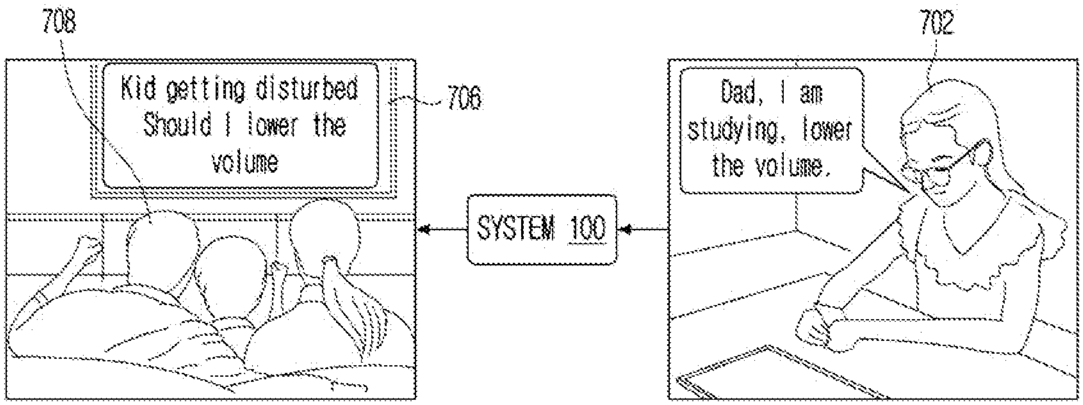
FIG. 7 is a use case for kid's study getting disturbed by loud TV, according to one or more embodiments.

FIG. 7 illustrates an example scenario, in which the loud volume of a television 706 is disturbing a kid 702 who is studying, according to one or more embodiments. The kid 702 may provide an utterance requesting the father 708 to reduce the volume as she is studying, such as "Dad, I am studying, lower the volume." The system 100 provides a suggestion to the father 708 on the television 706 to reduce the volume: "Kid getting disturbed. Should I lower the volume".

Figure 8:
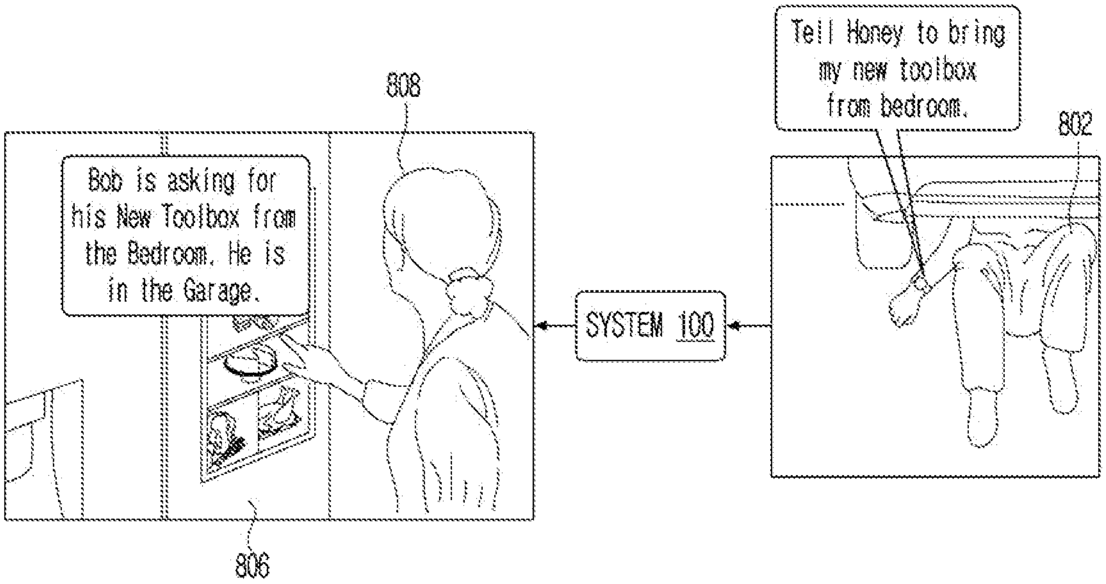
FIG. 8 is a use case diagram for a person is stuck in a tight spot and needs a new tool box, according to one or more embodiments.

FIG. 8 illustrates an example scenario, wherein a person 802 is stuck under his vehicle and requires a tool box that is not in his reach, according to one or more embodiments. The person 802 may provide an utterance requesting his wife 808 to fetch a tool box from the bedroom, such as "Tell Honey to bring my new tool box from the bedroom." The system 100 provides a suggestion to the wife 808 on the refrigerator 806 (because the wife 808 has been determined to be in the kitchen) to fetch the tool box from the bedroom and provide the tool box to the person in the garage as "Bob is asking for his New Tool Box from the Bedroom. He is in the Garage."

Figure 9:
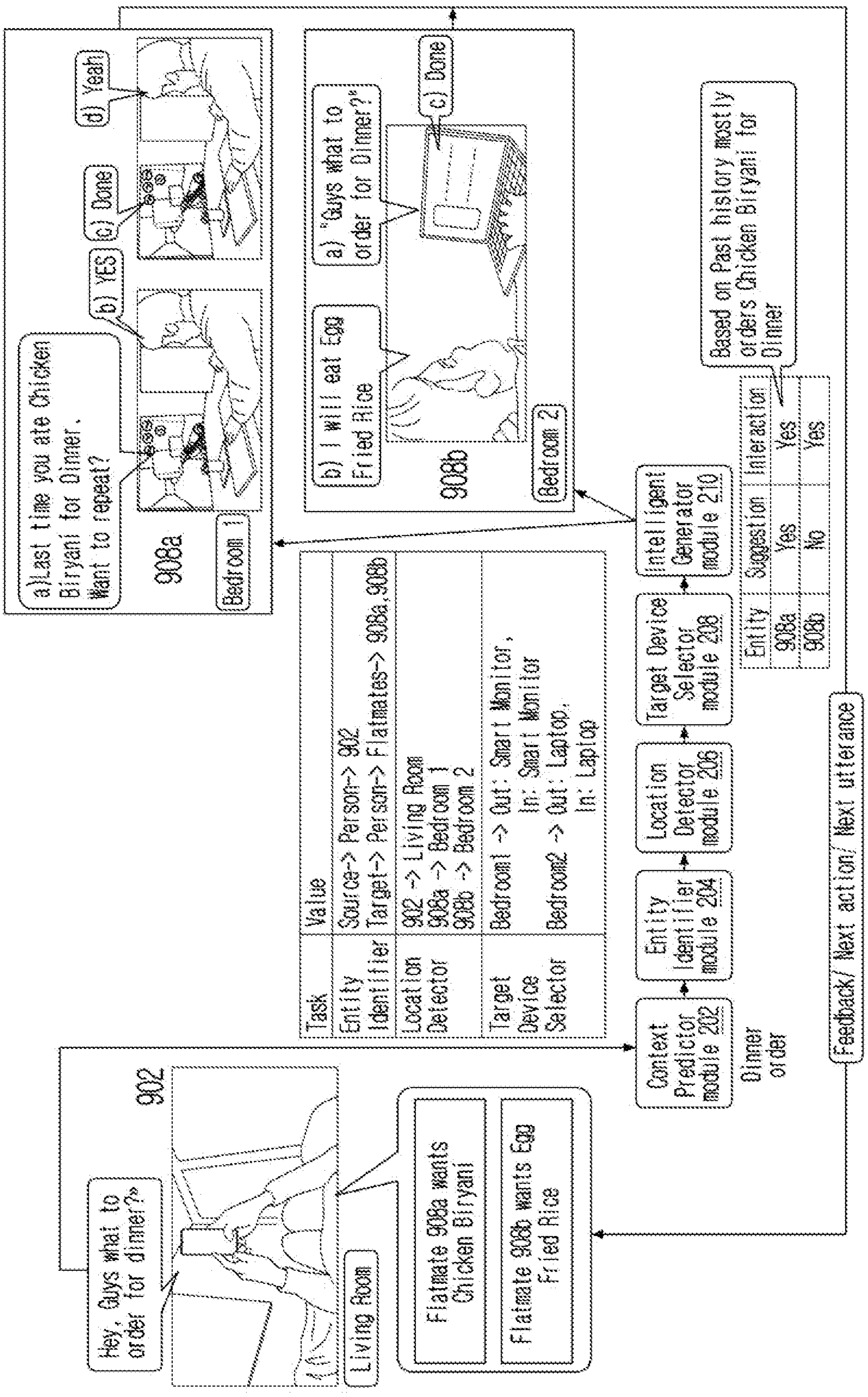
FIG. 9 is a use case diagram for ordering online dinner, according to one or more embodiments.

FIG. 9 illustrates an example scenario in which a person 902 provides an utterance asking his flatmate 908*a* and flatmate 908*b* about dinner orders, such as "Hey, Guys what to order for dinner?" The context identified herein is a dinner order. After the categorization of entities, the person 902 may be considered a source entity or source user 102, and flatmates 908*a* and 908*b* may be considered target entities or one or more target users 108. The location detector module 206 may determine the first user 102 (e.g., person 802) as being in the living room, may determine one second user 108 (e.g., flatmate 908*a*) as being in bedroom 1, and another second user 108 (e.g., flatmate 908*b*) as being in bedroom 2. In bedroom 1, the target device selector module 208 selects a smart monitor as an input and output device. In bedroom 2, the target device selector module 208 selects a laptop computer as an input and output device. In the case of flatmate, 908*a*, the system 100 provides suggestions to the flatmate 908*a* through the interactable interface based on his history, mostly ordering Chicken Biryani for Dinner as "Last time you ate Chicken Biryani for Dinner. Want to repeat?" Flatmate 908*b* replied "Yes". In the case of flatmate 908*b*, the system 100 provides an interaction to flatmate 908*b*, and he replied, "I will eat Egg Fried Rice." The system 100 appends the received input from the target devices associated with flatmates 908*a* and 908*b* to the device associated with person 902 through the interactable interface as "flatmate 908*a* wants Chicken Biryani", and "flatmate 908*b* wants Egg Fried Rice" respectively.

Figure 10:
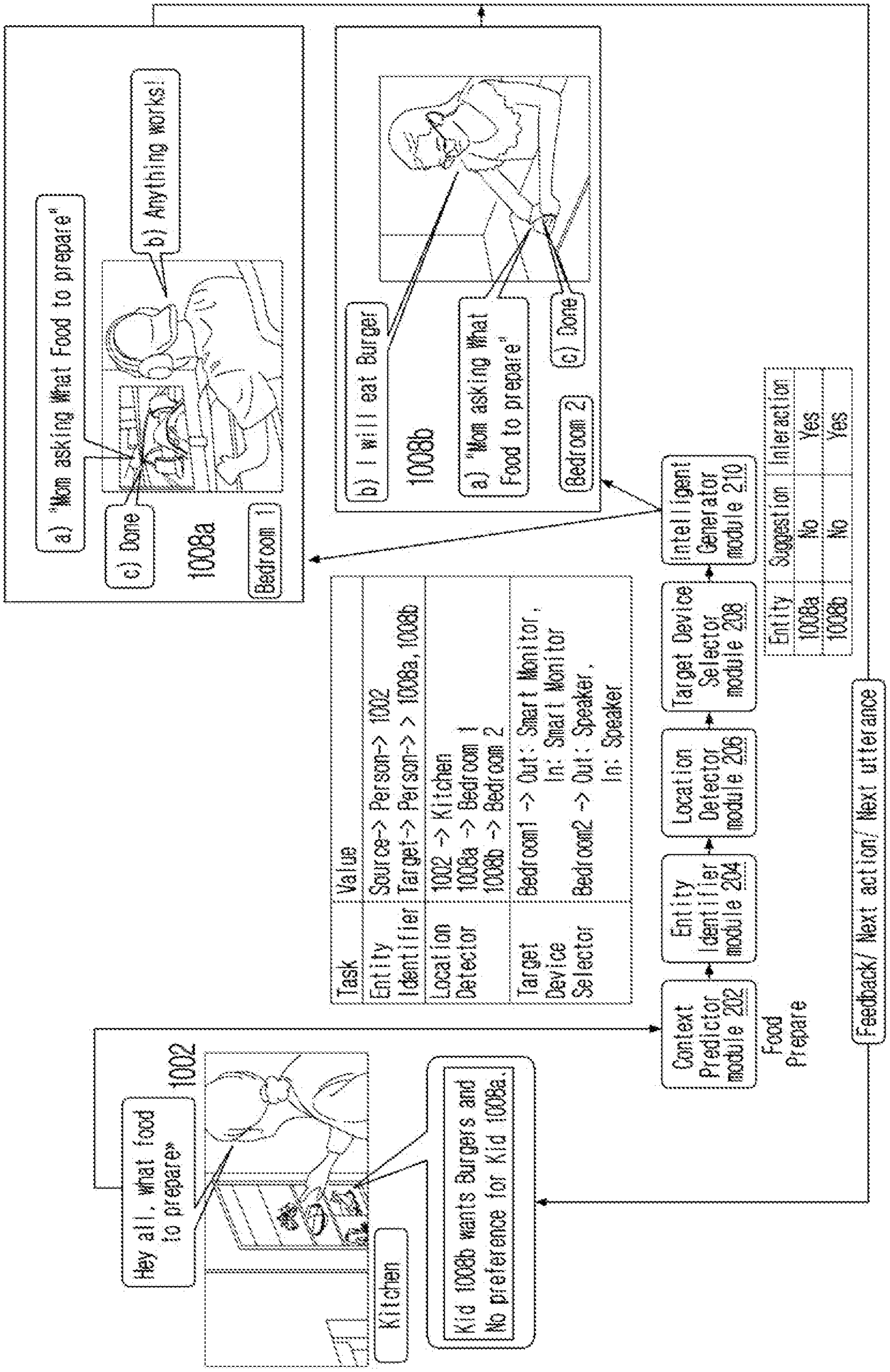
FIG. 10 is a use case diagram for food preparation, according to one or more embodiments.

FIG. 10 illustrates an example scenario, wherein a mother 1002 in a house provides an utterance asking her kid 1008*a* and her kid 1008*b* about food preparation, such as "Hey all, what food to prepare?" The context identified herein is food preparation. After the categorization of entities, Mom (1002 may be considered a source entity or source user 102, and kids 1008*a* and 1008*b* may be considered target entities or one or more target users 108. The location detector module 206 may determine the source user (e.g., Mom 1002*a*) as being in the kitchen, may determine one second user 108 (e.g., kid 1008*a*) as being in Bedroom 1, and another second user 108 (e.g., kid 1008*b*) as being in Bedroom 2. In bedroom 1, the target device selector module 208 may select a smart monitor as an input and output device. In bedroom 2, the target device selector module 208 may select a speaker as an input and output device. In the case of kid 1008*a*, the system 100 may provide interaction through the interactable interface, such as "Mom asking What Food to prepare". Kid 1008*a* may reply, "Anything works!". In the case of kid B, the system 100 may provide interaction to kid 1008*b*, and kid 1008*b* may reply, "I will eat Burger" The system 100 may append the received input from the target devices associated with kids 1008*a* and 1008*b* to the device associated with Mom 1002 through the interactable interface as ". Kid 1008*b* wants Burgers and No preference for kid 1008*a*."

Figure 11:
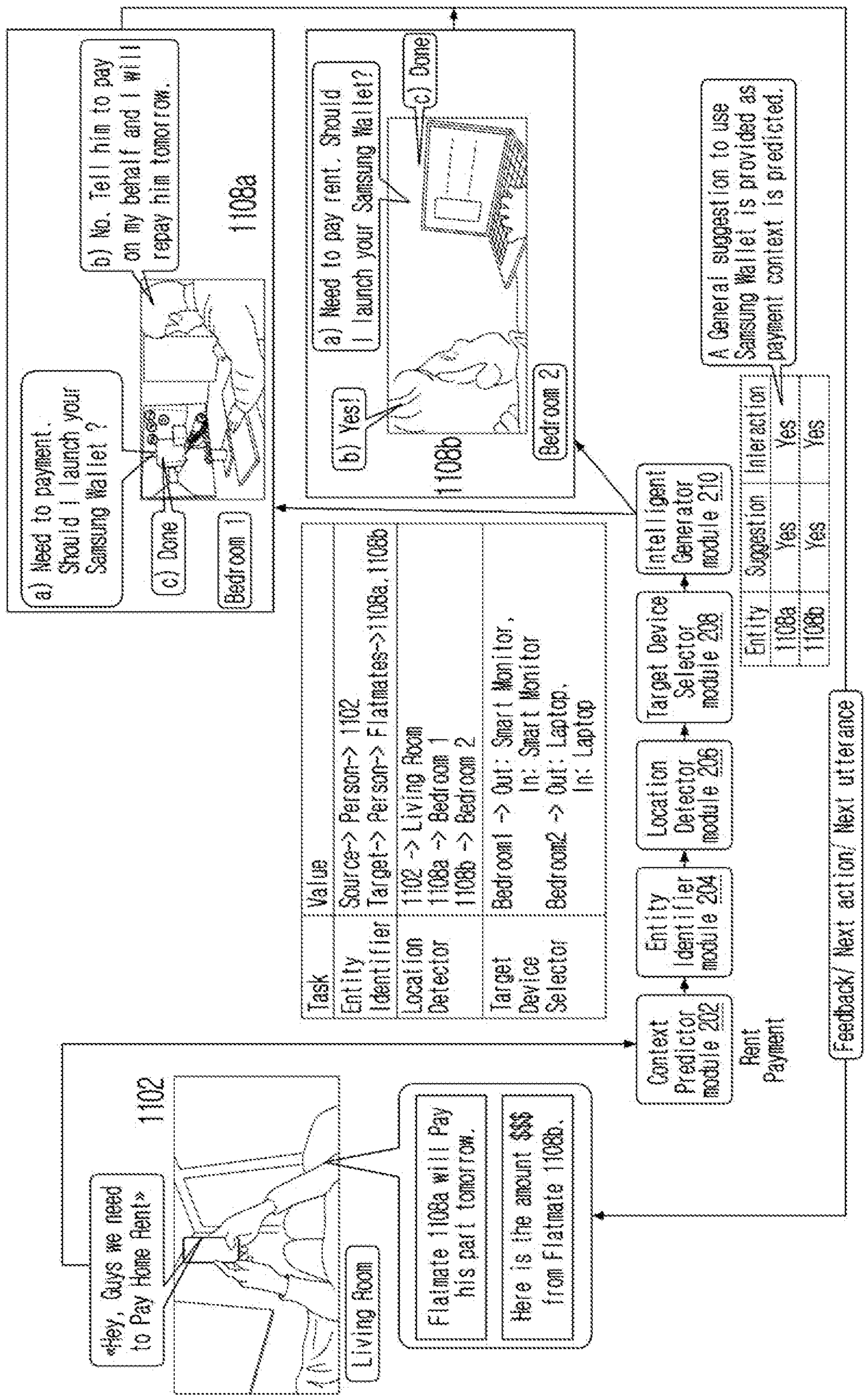
FIG. 11 is a use case diagram for rent payment, according to one or more embodiments.

FIG. 11 illustrates an example scenario in which a person 1102 provides an utterance asking his flatmate 1108*a* and 1108*b* about rent payment, such as "Hey, Guys we need to Pay Home Rent". The context identified herein is a rent payment. After the categorization of entities, the person 1102 may be considered a source entity or source user 102, and flatmates 1108*a* and 1108*b* may be considered target entities or one or more target users 108. The location detector module 206 may determine the source user 102 (e.g., person 1102) as being in the living room, may determine one second user 108 (e.g., flatmate 1108*a*) as being in bedroom 1, and may determine another second user 108 (e.g., flatmate 1108*b*) as being in bedroom 2. In bedroom 1, the target device selector module 208 selects a smart monitor as an input and output device. In bedroom 2, the target device selector module 208 selects a laptop computer as an input and output device. In the case of flatmate 1108*a*, the system 100 provides a general suggestion to his flatmates through the interactable interface, such as "Need to payment. Should I launch your Samsung Wallet?" flatmate 1108*a* replied, "No. Tell him to pay on my behalf, and I will repay him tomorrow". In the case of flatmate 1108*b*, he replied, "Yes!" The system 100 appends the received input from the target devices associated with flatmates 1108*a* and 1108*b* to the device associated with person 1102 through the interactable interface as "flatmate 1108*a* will Pay his part tomorrow", and "Here is the amount $$$ from flatmate 1108*b*," respectively.

Embodiments herein enable conduct of concurrent interactions, wherein simultaneous multifarious interactions are possible in parallel. Embodiments herein enable ease of use, wherein context or specification of entities are not required explicitly. Embodiments herein enable a reduction of human efforts, wherein the system 100 suggests and executes actions based on prior context which reduces human effort. Embodiments herein provide a quicker execution, wherein the time taken to complete a task will be less than doing manually. Embodiments herein reduce the cognitive load, wherein the system 100 will provide most relevant suggestions based on the context and priority.

The various actions, acts, blocks, steps, or the like in the method 300 may be performed in the order presented, in a different order or simultaneously. Further, in some embodiments, some of the actions, acts, blocks, steps, or the like may be omitted, added, modified, skipped, or the like without departing from the scope of the disclosure.

The embodiments disclosed herein may be implemented through at least one software program running on at least one hardware device and performing network management functions to control the elements. The elements may be at least one of a hardware device, or a combination of hardware device and software module.

The foregoing description of the specific embodiments is not intended to be limiting, and the embodiments described above may be modified and/or adapted for various applications without departing from the generic concept. Therefore, such adaptations and modifications should and are intended to be comprehended within the meaning, range, and scope of the disclosed embodiments. It is to be understood that the phraseology or terminology employed herein is for the purpose of description and not of limitation. Therefore, while the particular embodiments are described above in terms of at least one embodiment, those skilled in the art will recognize that the embodiments herein may be practiced with modification within the spirit and scope of the embodiments as described herein.

What is claimed is:

1. A method for enabling indirect interactions between users in an Internet of Things (IoT) environment, the method comprising:

receiving, by a first device, an utterance from a first user, wherein the utterance relates to at least one task that is to be performed by the first user;

predicting, by the first device, at least one context based on the utterance;

identifying, by the first device, one or more second users based on the predicted at least one context;

providing, by the first device, an interactable interface to one or more second devices which are located closer to the one or more second users than the first device, wherein the interactable interface comprises a suggestion generated based on the predicted at least one context;

receiving, by the first device, one or more inputs corresponding to the at least one task from the one or more second users through the interactable interface; and appending, by the first device, the received one or more inputs to the at least one task, wherein the one or more second users are related to the predicted at least one context.

2. The method as claimed in claim 1, wherein the predicting the at least one context and the identifying the one or more second users are performed using a trained learning method.

3. The method as claimed in claim 1, further comprising:

obtaining, by the first device, IoT data;

based on the IoT data, determining, by the first device, location history of at least one device which was last accessed by the one or more second users, based on the IoT data; and determining, by the first device, a current location of the one or more second users based on the location history.

4. The method as claimed in claim 1, wherein the one or more second devices are selected by the first device based on an availability of the one or more second devices, and a capability of the one or more second devices for performing at least one of delivering and receiving messages.

5. The method as claimed in claim 1, wherein the providing the interactable interface to the one or more second devices comprises generating at least one of an interaction and the suggestion to provide to the one or more second users, and wherein the generating the at least one of the interaction and the suggestion comprises:

obtaining, by the first device, user context data and environment context data; and correlating, by the first device, the user context data and the environment context data with the predicted at least one context.

6. The method as claimed in claim 5, further comprising:

based on at least a portion of the user context data and the environment context data being matched with the predicted at least one context, generating, by the first device, at least one suggestion, wherein the at least one suggestion is provided based on data stored in the one or more second devices or is provided as a recommendation that is relevant to the predicted at least one context; and based on the at least the portion of the user context data and the environment context data being not matched with the predicted at least one context, generating, by the first device, at least one interaction for directly conveying a message based on the utterance.

7. The method as claimed in claim 1, wherein the one or more inputs comprise at least one of a requirement corresponding to the at least one task and an action content to be performed according to the at least one task.

8. A device for enabling indirect interactions among users in an Internet of Things (IoT) environment, the device comprising:

at least one processor; and a memory configured to store instructions which, when executed by the at least one processor, cause the device to:

receive an utterance from a first user, wherein the utterance relates to at least one task that is to be performed by the first user;

predict, by the device, at least one context based on the utterance;

identify one or more second users based on the predicted at least one context;

provide an interactable interface to one or more target devices which are located closer to the one or more second users than the device, wherein the interactable interface comprises a suggestion generated based on the predicted at least one context;

receive one or more inputs corresponding to the at least one task from the one or more second users through the interactable interface; and append the received one or more inputs to the at least one task, wherein the one or more second users are related to the predicted at least one context.

9. The device as claimed in claim 8, wherein the instructions, when executed by the at least one processor, further cause the device to perform the predicting of the at least one context and the identifying of the one or more second users using a trained learning method.

10. The device as claimed in claim 8, wherein the instructions, when executed by the at least one processor, further cause the device to:

obtain IoT data;

determine location history of at least one device which was last accessed by the one or more second users, based on the IoT data; and determine a current location of the one or more second users based on the location history.

11. The device as claimed in claim 8, wherein the instructions, when executed by the at least one processor, further cause the device to select the one or more target devices based on an availability of the one or more target devices, and a capability of the one or more target devices for performing at least one of delivering and receiving messages.

12. The device as claimed in claim 8, wherein the instructions, when executed by the at least one processor, further cause the device to provide the interactable interface to the one or more target devices by generating at least one of an interaction and the suggestion to provide to the one or more second users, and wherein to generate the at least one of the interaction and the suggestion, the at least one processor is further configured to:

obtain user context data and environment context data; and correlate the user context data and the environment context data with the predicted at least one context.

13. The device as claimed in claim 12, wherein the instructions, when executed by the at least one processor, further cause the device to:

based on at least a portion of the user context data and the environment context data being matched with the predicted at least one context, generate at least one suggestion, wherein the at least one suggestion is provided based on data stored in the one or more target devices or is provided as a recommendation that is relevant to the predicted at least one context; and based on the at least the portion of the user context data and the environment context data being not matched with the predicted at least one context, generate at least one interaction for directly conveying a message based on the utterance.

14. A system for enabling indirect interactions among users in an Internet of Things (IoT) environment, the system comprising:

one or more target devices; and a source device comprising at least one processor and a memory configured to store instructions which, when executed by the at least one processor, cause the source device to:

receive an utterance from a first user, wherein the utterance relates to at least one task that is to be performed by the first user;

predict at least one context based on the utterance;

identify one or more second users based on the predicted at least one context;

provide an interactable interface to the one or more target devices, wherein the one or more target devices are located closer to the one or more second users than the source device, wherein the interactable interface comprises a suggestion generated based on the predicted at least one context;

receive one or more inputs corresponding to the at least one task from the one or more second users through the interactable interface; and append the received one or more inputs to the at least one task, wherein the one or more second users are related to the predicted at least one context.

15. The method of claim 1, wherein the suggestion is generated by correlating, by the first device, the at least one context with at least one from among user context data and environment context data.

* * * * *